United States Patent
Chae

(10) Patent No.: US 11,055,816 B2
(45) Date of Patent: Jul. 6, 2021

(54) IMAGE PROCESSING DEVICE, IMAGE PROCESSING METHOD, AND IMAGE PROCESSING PROGRAM

(71) Applicant: Rakuten, Inc., Tokyo (JP)

(72) Inventor: Yeongnam Chae, Tokyo (JP)

(73) Assignee: Rakuten, Inc., Tokyo (JP)

(*) Notice: Subject to any disclaimer, the term of this patent is extended or adjusted under 35 U.S.C. 154(b) by 27 days.

(21) Appl. No.: 16/475,742

(22) PCT Filed: Jun. 5, 2017

(86) PCT No.: PCT/JP2017/020843
§ 371 (c)(1),
(2) Date: Jul. 3, 2019

(87) PCT Pub. No.: WO2018/225133
PCT Pub. Date: Dec. 13, 2018

(65) Prior Publication Data
US 2019/0325557 A1     Oct. 24, 2019

(51) Int. Cl.
*G06T 3/40* (2006.01)
*G06T 7/90* (2017.01)
(Continued)

(52) U.S. Cl.
CPC .............. *G06T 3/40* (2013.01); *G06T 5/003* (2013.01); *G06T 7/90* (2017.01); *G06T 1/20* (2013.01)

(58) Field of Classification Search
CPC .. G06T 3/40; G06T 7/90; G06T 5/003; G06T 1/20; G06T 5/20; G06T 2207/30168;
(Continued)

(56) References Cited

U.S. PATENT DOCUMENTS

| 6,359,928 | B1* | 3/2002 | Wang | H04N 19/147 375/240.05 |
| 7,433,514 | B2* | 10/2008 | Sloan | G06T 5/009 382/162 |

(Continued)

FOREIGN PATENT DOCUMENTS

| JP | 2013-26936 A | 2/2013 |
| JP | 2014-164574 A | 9/2014 |
| WO | 2013/089265 A1 | 6/2013 |

OTHER PUBLICATIONS

International Search Report for PCT/JP2017/020843 dated Jun. 27, 2017.
(Continued)

*Primary Examiner* — Xuemei G Chen
(74) *Attorney, Agent, or Firm* — Sughrue Mion, PLLC

(57) ABSTRACT

An image processing device according to one embodiment includes an acquisition unit, a generation unit, a calculation unit, and an estimation unit. The acquisition unit acquires an input image. The generation unit generates a plurality of comparison images by compressing a target region being at least part of the input image with each of a plurality of compression levels and expanding the compressed target region to its original size. The calculation unit calculates, for each of the plurality of comparison images, a degradation level of the comparison image with respect to the input image. The estimation unit estimates the blur level of the input image based on a plurality of calculated degradation levels.

7 Claims, 13 Drawing Sheets

(51) Int. Cl.
*G06T 5/00* (2006.01)
*G06T 1/20* (2006.01)

(58) Field of Classification Search
CPC . G06T 2207/20084; G06T 2207/20004; G06T 2207/20081; G06T 2207/10004; G06T 2207/20016
See application file for complete search history.

(56) References Cited

U.S. PATENT DOCUMENTS

| | | | | |
|---|---|---|---|---|
| 10,049,309 B2* | 8/2018 | Hamabashiri | ............ | G06F 16/50 |
| 10,475,159 B2* | 11/2019 | Wakamiya | ............ | G06T 3/4015 |
| 2005/0111749 A1* | 5/2005 | Kondo | ................ | H04N 7/0135 |
| | | | | 382/261 |
| 2008/0002239 A1* | 1/2008 | Toma | ................... | G06T 3/4023 |
| | | | | 358/474 |
| 2008/0055430 A1* | 3/2008 | Kirsch | ................ | H04N 5/3572 |
| | | | | 348/241 |
| 2010/0007759 A1* | 1/2010 | Watanabe | .............. | H04N 5/232 |
| | | | | 348/222.1 |
| 2010/0080484 A1* | 4/2010 | Shimodaira | ........... | G06T 3/4007 |
| | | | | 382/264 |
| 2010/0215283 A1* | 8/2010 | Ono | ........................ | G06T 5/003 |
| | | | | 382/255 |
| 2011/0007819 A1* | 1/2011 | Chen | ...................... | H04N 19/63 |
| | | | | 375/240.19 |
| 2011/0013039 A1* | 1/2011 | Aisaka | .............. | H04N 5/23218 |
| | | | | 348/222.1 |
| 2012/0328213 A1* | 12/2012 | Yamamoto | ............ | G06T 3/4053 |
| | | | | 382/300 |
| 2013/0022293 A1 | 1/2013 | Yamazoe | | |
| 2013/0202204 A1* | 8/2013 | Yamanaka | .............. | G06T 5/003 |
| | | | | 382/167 |
| 2014/0184853 A1* | 7/2014 | Ogawa | ............. | H04N 5/232945 |
| | | | | 348/239 |
| 2014/0292769 A1* | 10/2014 | S V | ........................... | G06T 3/40 |
| | | | | 345/473 |
| 2014/0321738 A1 | 10/2014 | Shibata et al. | | |
| 2014/0334720 A1* | 11/2014 | Shibata | .................... | G06T 5/003 |
| | | | | 382/159 |
| 2015/0302566 A1* | 10/2015 | Shibata | ................ | G06K 9/6255 |
| | | | | 382/159 |
| 2016/0189357 A1* | 6/2016 | Shibata | .................... | G06K 9/40 |
| | | | | 382/197 |
| 2016/0247259 A1* | 8/2016 | Toyoda | .................... | G06T 3/40 |
| 2017/0301061 A1* | 10/2017 | Niikura | ................ | H04N 19/436 |
| 2017/0357911 A1* | 12/2017 | Liu | ..................... | G03F 7/70441 |
| 2018/0025476 A1* | 1/2018 | Akahane | .................. | H04N 9/07 |
| | | | | 382/106 |
| 2018/0336662 A1* | 11/2018 | Kimura | ................. | G06T 3/4053 |

OTHER PUBLICATIONS

International Preliminary Report on Patentability with a Translation of Written Opinion in International Application No. PCT/JP2017/020843, dated Dec. 19, 2019.

\* cited by examiner

| BLUR LEVEL | baby | bird | butterfly | baboon | lena |
|---|---|---|---|---|---|
| 1.5 | 0.1662 | 0.1779 | 0.1558 | 0.1073 | 0.1533 |
| 2.5 | 0.2306 | 0.2219 | 0.2143 | 0.2096 | 0.2162 |
| 3.5 | 0.2772 | 0.2736 | 0.2806 | 0.3192 | 0.2738 |

IMAGE PROCESSING DEVICE, IMAGE PROCESSING METHOD, AND IMAGE PROCESSING PROGRAM

CROSS REFERENCE TO RELATED APPLICATIONS

This application is a National Stage of International Application No. PCT/JP2017/020843, filed Jun. 5, 2017.

TECHNICAL FIELD

One aspect of the present invention relates to an image processing device, an image processing method, and an image processing program.

BACKGROUND ART

To process an image containing blur, it is necessary to estimate the blur level in advance. The image processing device disclosed in Patent Literature 1 performs template matching by using one of input images as a standard image and the other input image as a reference image and thereby estimates the blur level of the reference image.

CITATION LIST

Patent Literature

PTL1: JP 2014-164574 A

SUMMARY OF INVENTION

Technical Problem

However, in the case where there is only one input image to be processed, it is not possible to estimate the blur level by template matching. Thus, there is a demand for a mechanism to estimate the blur level of an input image even when there is only one input image.

Solution to Problem

An image processing device according to one aspect of the present invention includes an acquisition unit configured to acquire an input image, a generation unit configured to generate a plurality of comparison images by compressing a target region being at least part of the input image with each of a plurality of compression levels and expanding the compressed target region to its original size, a calculation unit configured to calculate, for each of the plurality of comparison images, a degradation level of the comparison image with respect to the input image, and an estimation unit configured to estimate a blur level of the input image based on a plurality of calculated degradation levels.

An image processing method according to one aspect of the present invention is an image processing method performed by an image processing device including a processor, the method including an acquisition step of acquiring an input image, a generation step of generating a plurality of comparison images by compressing a target region being at least part of the input image with each of a plurality of compression levels and expanding the compressed target region to its original size, a calculation step of calculating, for each of the plurality of comparison images, a degradation level of the comparison image with respect to the input image, and an estimation step of estimating a blur level of the input image based on a plurality of calculated degradation levels.

An image processing program according to one aspect of the present invention causes a computer to execute an acquisition step of acquiring an input image, a generation step of generating a plurality of comparison images by compressing a target region being at least part of the input image with each of a plurality of compression levels and expanding the compressed target region to its original size, a calculation step of calculating, for each of the plurality of comparison images, a degradation level of the comparison image with respect to the input image, and an estimation step of estimating a blur level of the input image based on a plurality of calculated degradation levels.

In the above-described aspects, a plurality of comparison images are obtained by compressing and expanding an input image with a plurality of ratios. Those comparison images are images where the resolution of the input image is intentionally degraded. Because a blur of the input image can be regarded as a decrease in resolution, the blur level of the input image can be estimated by comparing the input image with those comparison images. Because the comparison images for estimating the blur level of the input image are generated from the input image, it is possible to estimate the blur level of the input image even when there is only one input image.

Advantageous Effects of Invention

According to one aspect of the present invention, it is possible to estimate the blur level of an input image even when there is only one blur level.

BRIEF DESCRIPTION OF DRAWINGS

FIG. 6 is view showing other examples of processing of generating a comparison image.

FIG. 10 is a view illustrating an example of estimation of a blur level.

DESCRIPTION OF EMBODIMENTS

An embodiment of the present invention is described hereinafter with reference to the attached drawings. Note that, in the description of the drawings, the same elements are denoted by the same reference symbols and redundant description thereof is omitted.

Overview

An image processing device 10 according to an embodiment is a computer or a computer system that objectively estimates the blur level of an image.

"Image" is an image where an object is fixed on a certain medium so that it is perceivable by human eyes. The image becomes visually perceivable by processing data indicating an image (image data), which can be processed by a computer. To be specific, the image becomes visually perceivable by being recorded in a storage device such as a memory and output to an output device such as a monitor by processing of a processor. The image may be a still image or each frame that forms a moving image.

"Blur level" is an index indicating how much an image is blurred, or an index indicating how much the resolution is degraded. "Blur" is a phenomenon where the outline of a subject, which should be clear, is not clearly shown in an image. "Resolution" is a value indicating the density of pixels in an image. In this embodiment, the blur level is higher as the outline of an image is less clear.

Figure 1:
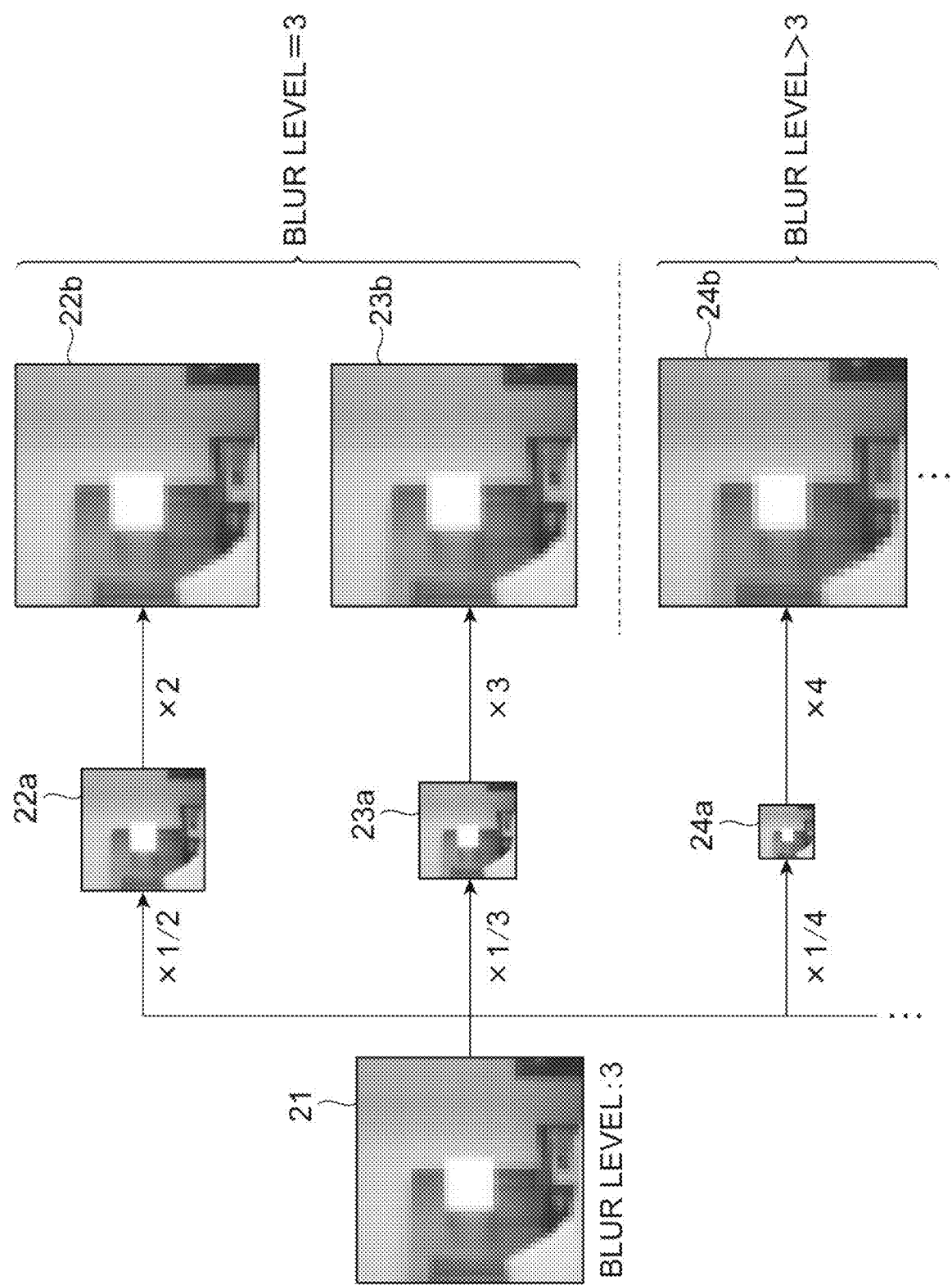
FIG. 1 is a view showing the concept of estimation of a blur level in an embodiment.

FIG. 1 is a view showing the concept of estimation of the blur level in this embodiment. In this example, it is assumed that an image processing device 10 estimates the blur level of an input image 21 whose actual blur level is 3. First, the image processing device 10 generates a plurality of comparison images by compressing the input image 21 with each of a plurality of ratios and then simply expanding the compressed image back to its original size. In the example of FIG. 1, the image processing device 10 compresses the input image 21 to 1/2 and thereby generates a compressed image 22a (the compression ratio is 1/2; this is hereinafter referred to also as "1/2 compression"), then simply expands the compressed image 22a to double its size and thereby generates a comparison image 22b. Further, the image processing device 10 changes the compression ratio to 1/3 and generates a compressed image 23a from the input image 21, then simply expands the compressed image 23a to triple its size and thereby generates a comparison image 23b. Furthermore, the image processing device 10 changes the compression ratio to 1/4 and generates a compressed image 24a from the input image 21, then simply expands the compressed image 24a to quadruple its size and thereby generates a comparison image 24b. In this manner, the image processing device 10 generates comparison images by changing the compression ratio to 1/5, 1/6, etc.

"Compression" is processing that reduces the size of an image, allowing a loss of at least part of information (e.g., color information) of the image. "Simply expanding a compressed image" means enlarging the size of a compressed image without restoring information lost due to compression. Therefore, the resolution of a comparison image is generally lower than the resolution of an original image.

When an image which should be clear is blurred, the resolution of this image is initially low. When the degree of decrease in resolution at the time of generating a comparison image is equal to or lower than the inherent degree of decrease in resolution of the original image, the resolution is not substantially degraded even by compression and expansion (to be exact, ignorable slight degradation of the resolution can occur due to compression). Thus, in this case, the image quality of the comparison image is the same or substantially the same as that of the original image. On the other hand, when the degree of compression is more than the inherent blur level (the degree of decrease in resolution) of the original image, the resolution of the comparison image becomes lower than that of the original image.

In the example of FIG. 1, it is assumed that the blur level of the input image 21 is 3, which corresponds to 1/3 compression. Assume the case where the input image 21 is obtained by compressing an unblurred image (clear image) to 1/3. In this case, the blur level of the comparison image 22b obtained by 1/2 compression is also 3. Further, the blur level of the comparison image 23b obtained by 1/3 compression is also 3. However, because the compression ratio of 1/4 is higher than the compression ratio (1/3) corresponding to the inherent blur level of the input image 21, the blur level of the comparison image 24b obtained by 1/4 compression is higher than 3. The blur level of the comparison image is also higher than 3 when the compression ratio is further increased to 1/5, 1/6, etc. Therefore, the blur level of the input image 21 can be estimated to be 3, or any value from 3 to 4.

In this manner, the image processing device 10 generates a plurality of comparison images by performing compression and expansion of an original image with a plurality of ratios and determines the degree of deterioration of the resolution of those comparison images, and thereby estimates the blur level of the original image.

In this embodiment, the image processing device 10 enhances the resolution of the image by performing super-resolution based on the estimated blur level. "Super-resolution" is a technique that generates a high-resolution image from a low-resolution image (i.e., enhances the resolution of the image). Note that there is a possibility that the resolution does not substantially change or does not change at all as a result of super-resolution.

Configuration of Device

Figure 2:
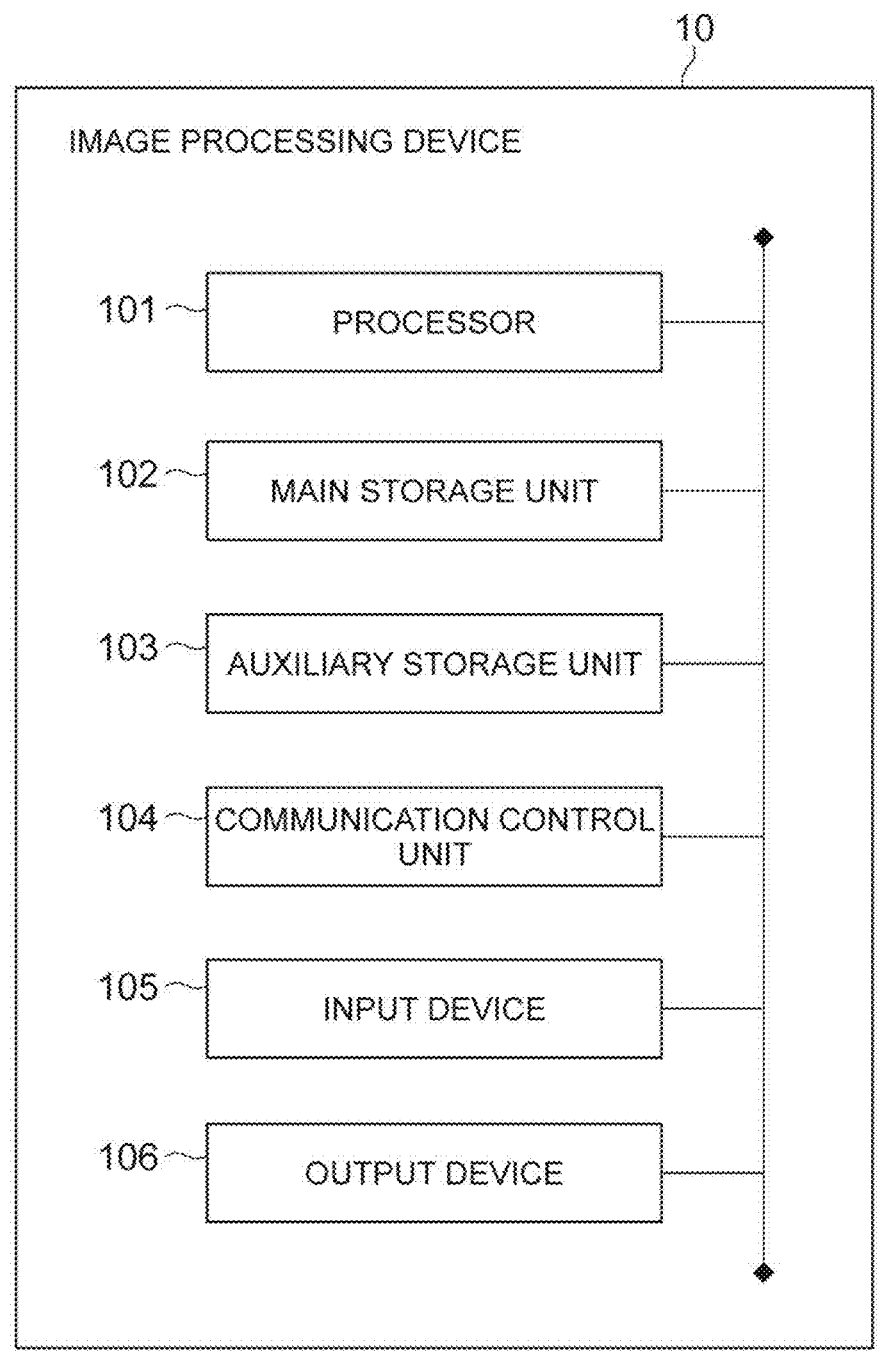
FIG. 2 is a view showing the hardware configuration of an image processing device according to the embodiment.

FIG. 2 shows a typical hardware configuration of the image processing device 10. The image processing device 10 includes a processor 101 that runs an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a monitor.

The functional elements of the image processing device 10 are implemented by loading given software (for example, an image processing program P1, which is described later) onto the processor 101 or the main storage device 102 and running the program. The processor 101 makes the communication control device 104, the input device 105 or the output device 106 operate in accordance with the software, and reads and writes data to and from the main storage device 102 or the auxiliary storage device 103. Data or databases required for the processing are stored in the main storage device 102 or the auxiliary storage device 103.

The image processing device 10 may be composed of a single computer or a plurality of computers. In the case of using a plurality of computers, those computers are connected through a communication network such as the Internet or an intranet, and thereby one image processing device 10 is logically constructed.

Figure 3:
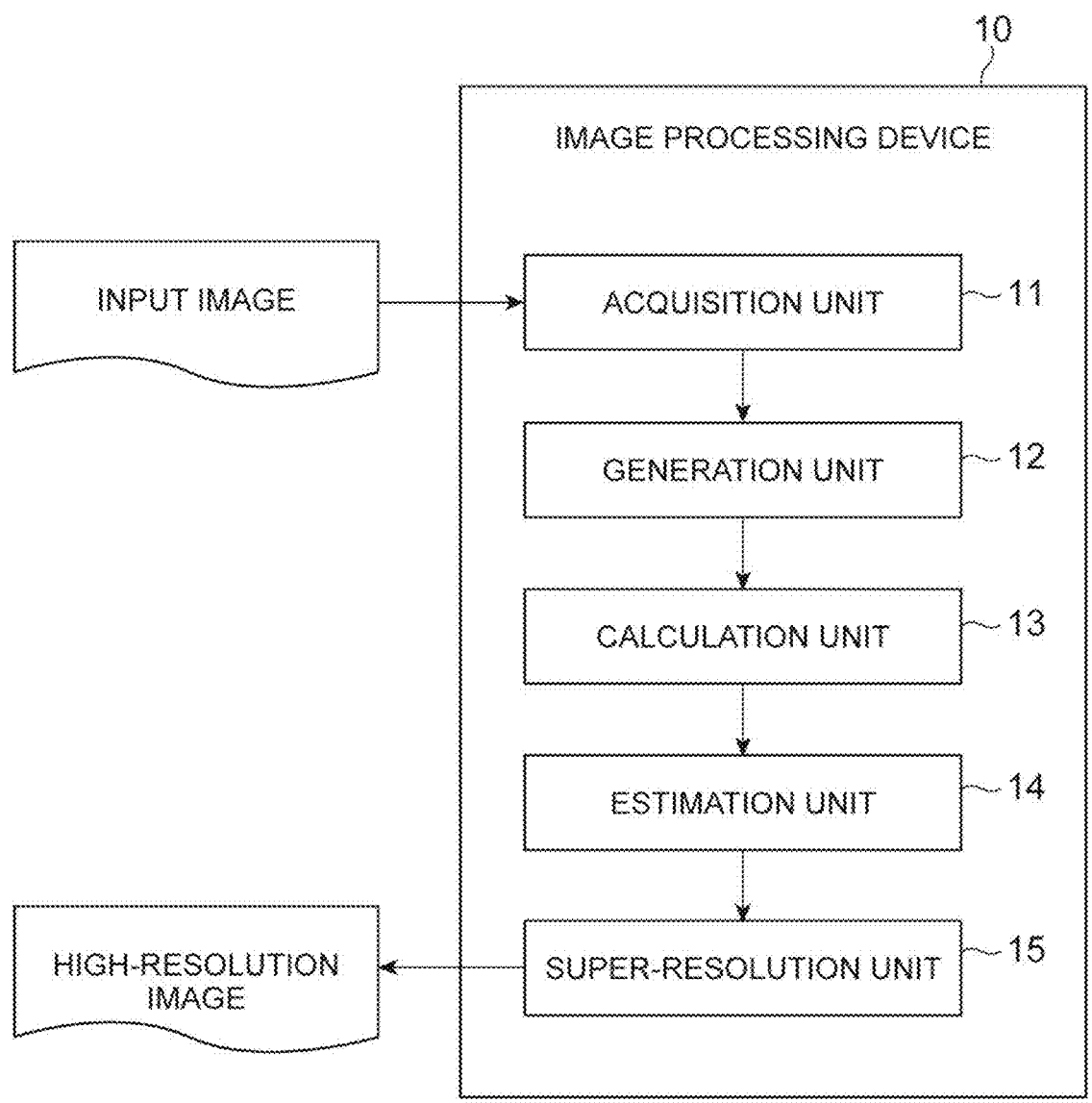
FIG. 3 is a view showing the functional configuration of the image processing device according to the embodiment.

FIG. 3 shows the functional configuration of the image processing device 10. In this embodiment, the image processing device 10 includes an acquisition unit 11, a generation unit 12, a calculation unit 13, an estimation unit 14, and a super-resolution unit 15 as functional elements.

The acquisition unit 11 is a functional element that acquires an input image. The input image is an image to be processed to estimate the blur level thereof. The input image may be referred to as an original image. In this embodiment, the input image is a target of super-resolution.

The generation unit 12 is a functional element that generates a plurality of comparison images to be used to estimate the blur level of the acquired input image. The generation unit 12 obtains a comparison image by setting at least part of the input image as a target region and performing processing for reducing the resolution of this target region. The comparison image is an image obtained by intentionally degrading the image quality of the input image. Note that, however, there is a case where the resolution of the comparison image is the same or substantially the same as that of the input image as described above with reference to FIG. 1. The "target region" is a range composed of pixels arranged in a row. The target region may be only part of the input image or the whole of the input image. The generation unit 12 outputs the plurality of comparison images to the calculation unit 13.

The calculation unit 13 is a functional element that calculates, for each of the plurality of comparison images obtained by the generation unit 12, the degradation level of the comparison image with respect to the input image. Thus, the calculation unit 13 obtains a plurality of degradation levels for one input image. The "degradation level" is an index indicating how much the resolution of the comparison image is degraded compared with the resolution of the input image. The calculation unit 13 outputs the plurality of calculated degradation levels to the estimation unit 14.

The estimation unit 14 is a functional element that estimates the blur level of the input image based on a plurality of calculated degradation levels. In this embodiment, the estimation unit 14 outputs this blur level to the super-resolution unit 15.

The super-resolution unit 15 is a functional element that performs super-resolution by machine learning (to be specific, deep learning) on the acquired input image. "Machine learning" is a technique for autonomously finding a law or rule by means of repetitive learning based on given information. The machine learning is an approach to solve a problem by providing a computer with learning ability. "Deep learning" is machine learning using a multi-layer neural network (deep-layer neural network). The "neural network" is an information processing model (learning model) that simulates the mechanism of the human cranial nerve system.

Operation of Device

The operation of the image processing device 10 and an image processing method according to this embodiment are described hereinafter with reference to FIGS. 4 to 12.

Figure 4:
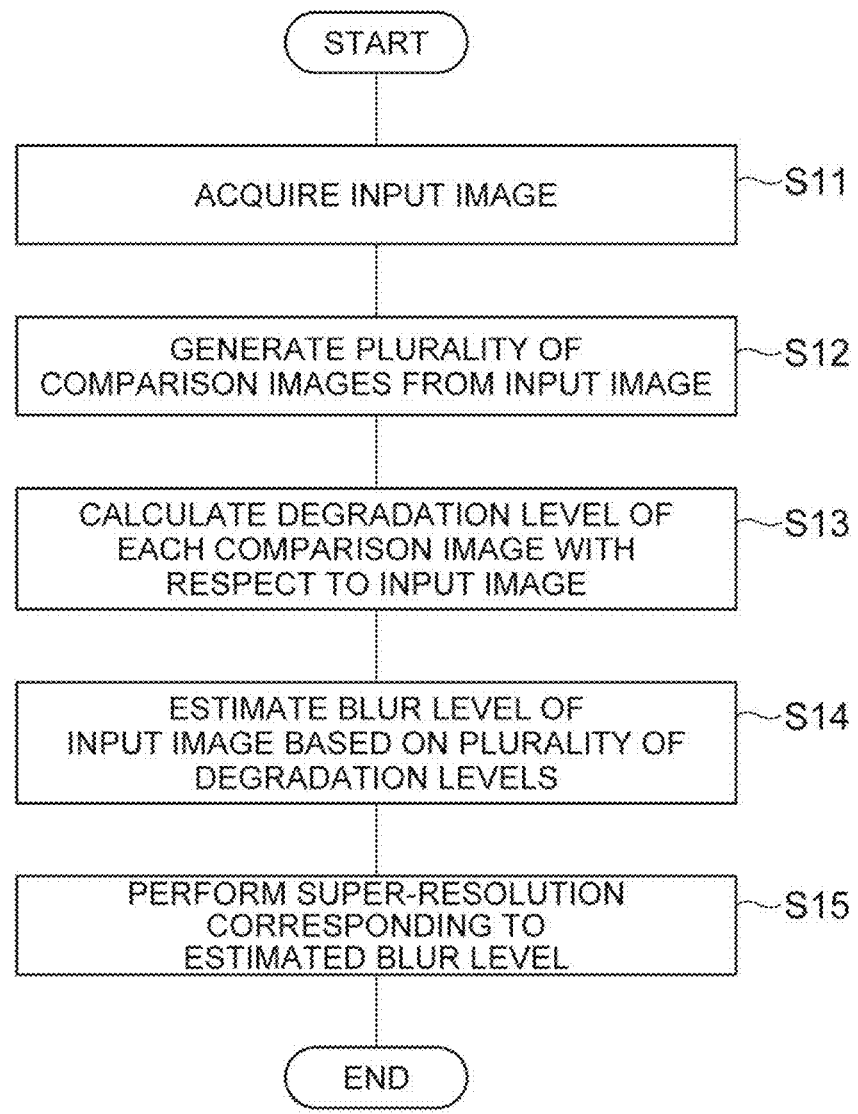
FIG. 4 is a flowchart showing a process in the image processing device according to the embodiment.

FIG. 4 is a flowchart showing a process in the image processing device 10. First, the acquisition unit 11 acquires one input image (Step S11, acquisition step). A method of acquiring the input image is not particularly limited. For example, the acquisition unit 11 may read the input image by accessing an image database that stores arbitrary images. Note that the image database may be a separate device from the image processing device 10 or may be part of the image processing device 10. Alternatively, the acquisition unit 11 may acquire the input image input or designated by a user of the image processing device 10. Alternatively, the acquisition unit 11 may receive the input image from another computer.

Next, the generation unit 12 generates a plurality of comparison images from the input image (Step S12, generation step). The generation unit 12 generates one comparison image as follows. The generation unit 12 reproduces the input image and thereby obtains an input image for generating a comparison image (which is also referred to hereinafter simply as "input image"). Then, the generation unit 12 sets at least part of this input image as a target region, reduces the resolution of the target region and thereby obtains a comparison image. The generation unit 12 obtains the comparison image by compressing the target region and then simply expanding this compressed target region back to its original size.

In the compression processing, the generation unit 12 compresses the target region by moving an operator with a specified size around within the target region and converting color information in this operator to one representative value. A method of determining the representative value is not particularly limited. For example, the generation unit 12 may set the average value of color information in the operator as the representative value, or may set color information that appears most frequently in the operator as the representative value. When there are a plurality of color information in the operator, one or more pieces of color information is lost by this compression, and this lost color information is not restored even when the compressed target region is simply expanded to its original size. Thus, the resolution of the target region is degraded by compressing and expanding the target region.

The compression ratio of the target region is determined by the size and moving distance of the operator. For example, when the size of the operator is 2 (pixels)×2 (pixels) and the moving distance of the operator is 2 (pixels), the compression ratio is 1/2. When the size of the operator is 2×2 and the moving distance of the operator is 1, the compression ratio is 1/1.5. When the size of the operator is 3×3 and the moving distance of the operator is 3 the compression ratio is 1/3.

Figure 5:
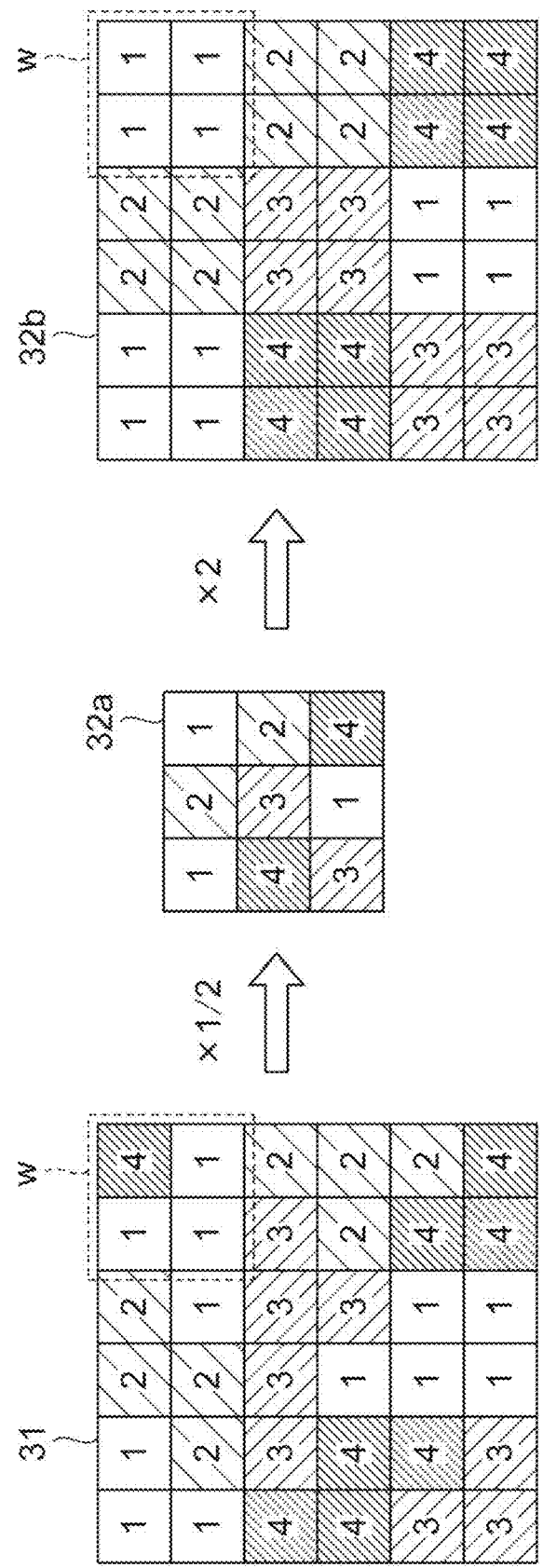
FIG. 5 is view showing an example of processing of generating a comparison image.

FIG. 5 is a view showing an example of processing of generating a comparison image. In this example, the generation unit 12 performs 1/2 compression on a target region 31 with 6 (pixels)×6 (pixels), and thereby generates a compressed image 32a composed of 9 (=3×3) representative values. Then, the generation unit 12 doubles the compressed image 32a to make it back to its original size and thereby generates a target region 32b. The target region 32b is at least part of a comparison image. By this processing, several pieces of color information in the target region 31 are rounded, and the resolution of the target region 32b becomes lower than that of the target region 31. For example, the pixel with the color information "4" in a part enclosed by an operator w is lost by compression and expansion, and the color information of this part is rounded to "1" in the target region 32b.

Figure 6:
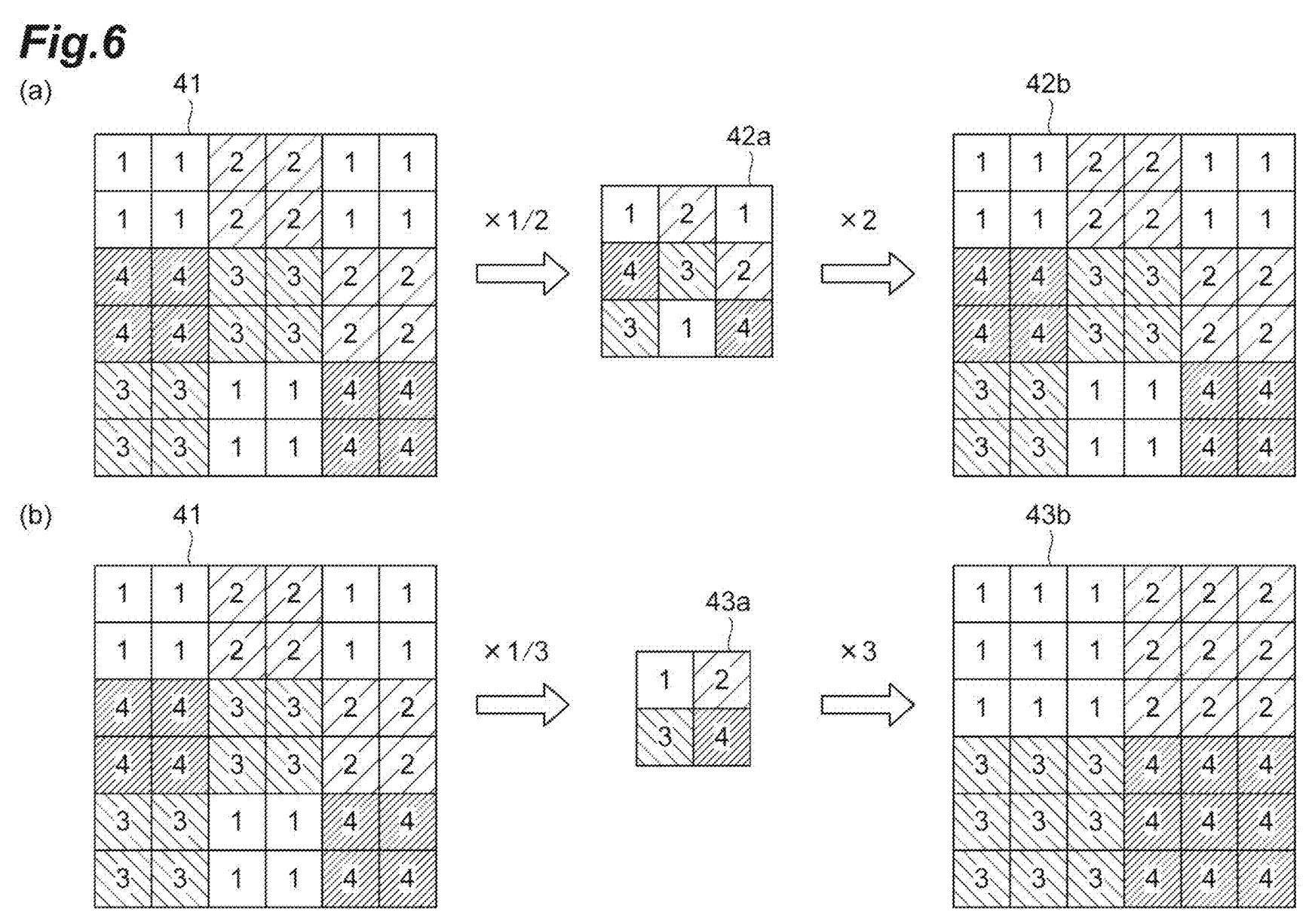

FIG. 6 is a view showing other examples of processing of generating a comparison image. A target region 41 with 6 (pixels)×6 (pixels) is common to two examples (a) and (b), and this target region 41 is the same as the target region 32b in FIG. 5. Thus, the target region 41 corresponds to a blurred version of the above-described target region 31.

In the example of FIG. 6(a), the generation unit 12 performs 1/2 compression on the target region 41 and generates a 3×3 compressed image 42a, doubles this compressed image 42a to make it back to its original size and thereby generates a target region 42b. The target region 42b is at least part of a comparison image. This target region 42b is the same as the target region 41, and this is because the target region 41 originally has a blur corresponding to 1/2 compression.

On the other hand, in the example of FIG. 6(b), the generation unit 12 performs 1/3 compression on the target region 41 and generates a 2×2 compressed image 43a, triples this compressed image 43a to make it back to its original size and thereby generates a target region 43b. The target region 43b is at least part of a comparison image. By this processing, several pieces of color information in the target region 41 are rounded, and the resolution of the target region 43b becomes lower than that of the target region 41.

The generation unit 12 generates a plurality of comparison images while changing the compression ratio. This means that a plurality of comparison images with different degrees of degradation of resolution from each other are generated. Setting of the compression ratio and the number of comparison images are not particularly limited. For example, the generation unit 12 may generate a plurality of comparison images while changing the compression ratio to 1/2, 1/3, 1/4, etc., or may generate a plurality of comparison images while changing the compression ratio to 1/1.5, 1/2.5, 1/3.5, etc. Alternatively, the generation unit 12 may generate a plurality of comparison images while changing the compression ratio to 1/1.5, 1/2, 1/2.5, 1/3, 1/3.5, etc.

Then, the calculation unit 13 calculates the degradation level of each comparison image with respect to the input image (Step S13, calculation step). In this embodiment, the calculation unit 13 uses peak signal-to-noise ratio (PSNR) as the degradation level. The PSNR, in units of decibel (dB), is an index of the image quality calculated based on the mean square error between a reference image and an evaluation image. The PSNR is used to objectively evaluate how much an image is degraded due to compression, for example. In general, as the PSNR is higher, the image quality is evaluated to be higher. As for the relationship with an image blur, as the image is more blurred, the PSNR is lower. The calculation unit 13 calculates the PSNR based on the mean square error between an input image (reference image) and a comparison image (an evaluation image). In the example of FIG. 1, the calculation unit 13 at least calculates $PSNR_1$ obtained from the input image 21 and the comparison image 22b, $PSNR_2$ obtained from the input image 21 and the comparison image 23b, $PSNR_3$ obtained from the input image 21 and the comparison image 24b and the like.

Then, the estimation unit 14 estimates the blur level of the input image based on a plurality of degradation levels (PSNR in this embodiment) (Step S14, estimation step). To be more specific, the estimation unit 14 calculates the relationship between the compression level and the degradation level and estimates the blur level based on this relationship. The "compression level" is an index indicating the degree of compression of an input image when generating a comparison image from the input image. In this embodiment, the inverse of the compression ratio is used as the compression level; however, a method of representing the compression level is not particularly limited. For example, the compression ratio may be used as the compression level, or the compression level may be represented by another way. A method of estimating the blur level is not particularly limited. Several estimation methods are described hereinafter with reference to FIGS. 7 to 11.

The estimation unit 14 may estimate the blur level by comparing a plurality of PSNRs with a threshold. To be specific, the estimation unit 14 may calculate the relationship between the compression level and the PSNR, and estimate the compression level when the PSNR coincides with the threshold as the blur level.

Figure 7:
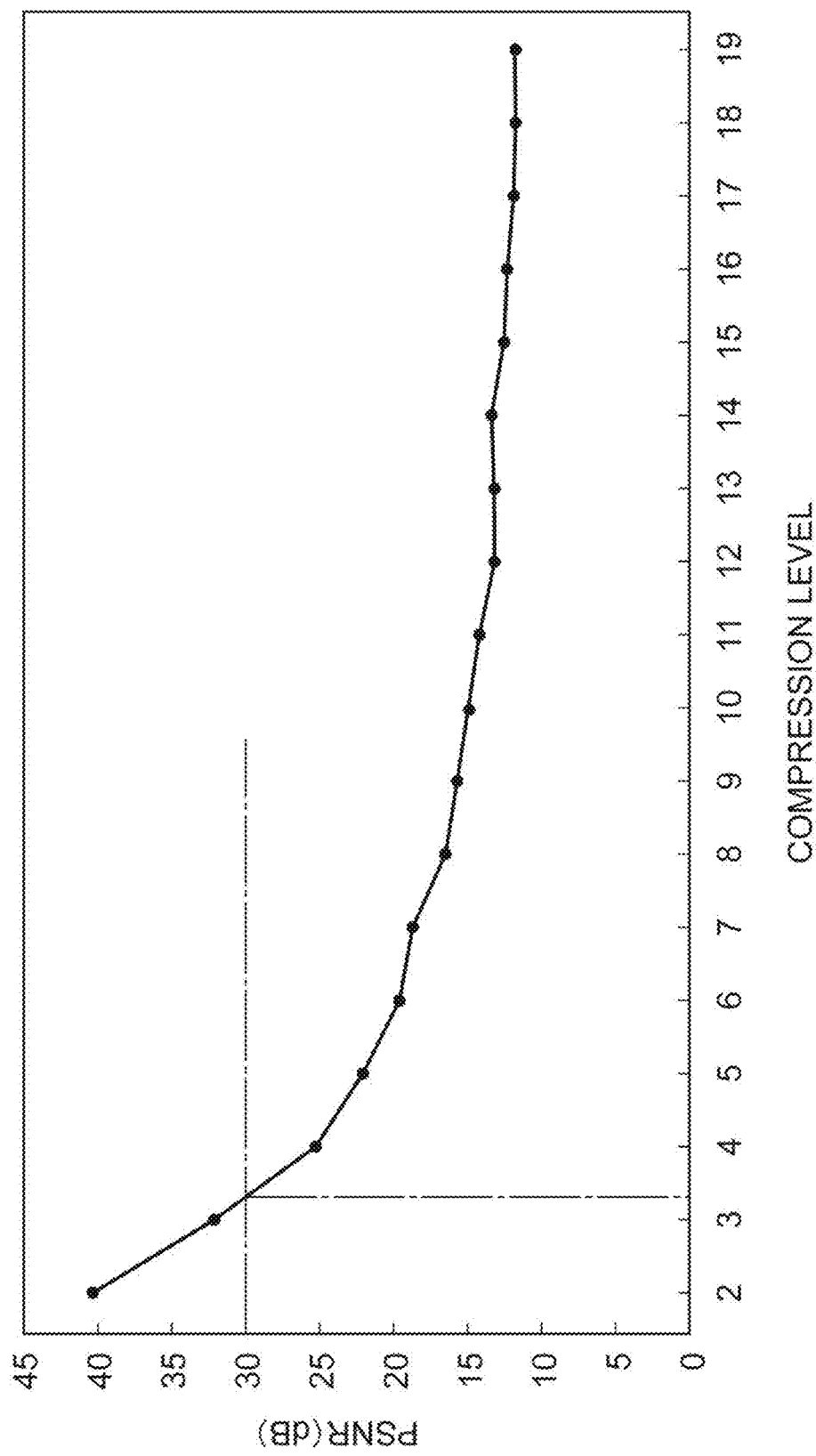
FIG. 7 is a view illustrating an example of estimation of a blur level.

FIG. 7 is a graph showing an example of the relationship between the compression level and the PSNR, where the horizontal axis indicates the compression level and the vertical axis indicates the PSNR. This graph is obtained by plotting a plurality of PSNRs calculated while changing the compression level to 2, 3, 4, etc. (changing the compression ratio to 1/2, 1/3, 1/4, etc.), and linearly interpolates between points. Assuming that the threshold is 30 dB in this example, the estimation unit 14 may estimate the compression level (approx. 3.3) when the PSNR coincides with this threshold as the blur level. Note that it is assumed that the threshold is 30 dB in this example because normal PSNR in lossy compression of an image or video is 30 to 50 dB, and because an example of the minimum value of the PSNR where image degradation is insignificant is 30 dB. As a matter of course, the threshold of the PSNR is not limited to 30 dB. The threshold may be varied according to an input image.

Alternatively, the estimation unit 14 may approximate the relationship between the compression level and the PSNR by a non-linear function, and estimate the blur level based on the leading coefficient of this non-linear function (to be more specific, the leading coefficient of a polynomial that defines the non-linear function). The non-linear function is not particularly limited, and it may be a quadratic function, a cubic function, or a higher-order function, for example. A method of approximation by the non-linear function is also not limited, and the least-squares method may be used, for example.

Figure 8:
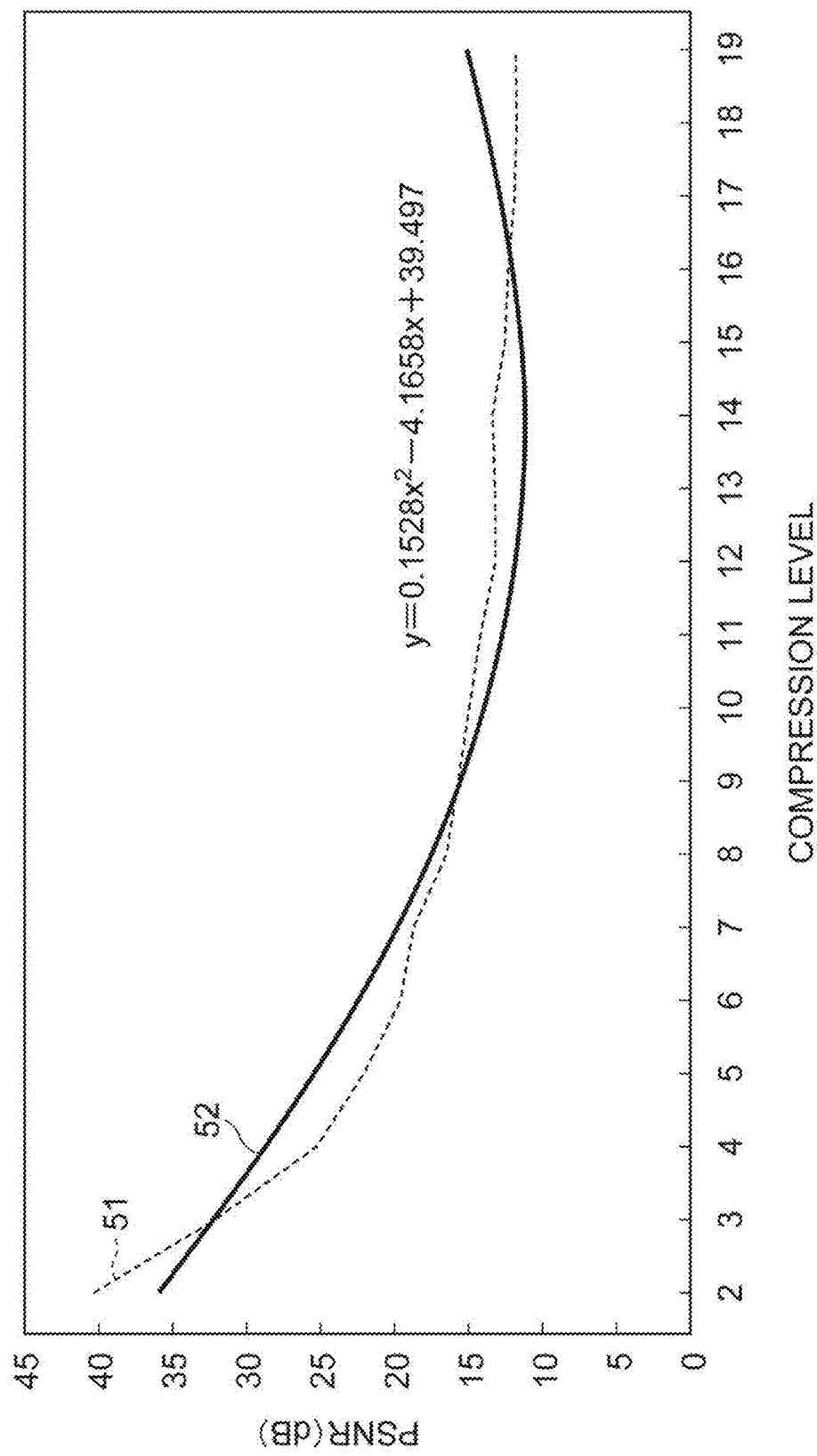
FIG. 8 is a view illustrating an example of estimation of a blur level.

FIG. 8 is a graph that approximates the relationship between the compression level and the PSNR in FIG. 7 by a quadratic function. The dotted line 51 is the same as the plot and linear interpolation in FIG. 7, and the solid line 52 indicates the non-linear function. In this example, the estimation unit 14 generates the non-linear function and obtains the leading coefficient (0.1528) of this function and estimates the blur level based on this value.

If the relationship between the compression level and the PSNR of each image is represented by a graph when the blur level is the same or approximate between a plurality of images with different subjects, the degree of curve (the curvature) of each graph is almost similar to each other. On the other hand, the degree of curve indicating the relationship between the compression level and the PSNR varies when the blur level is different even if an image is the same.

Figure 9:
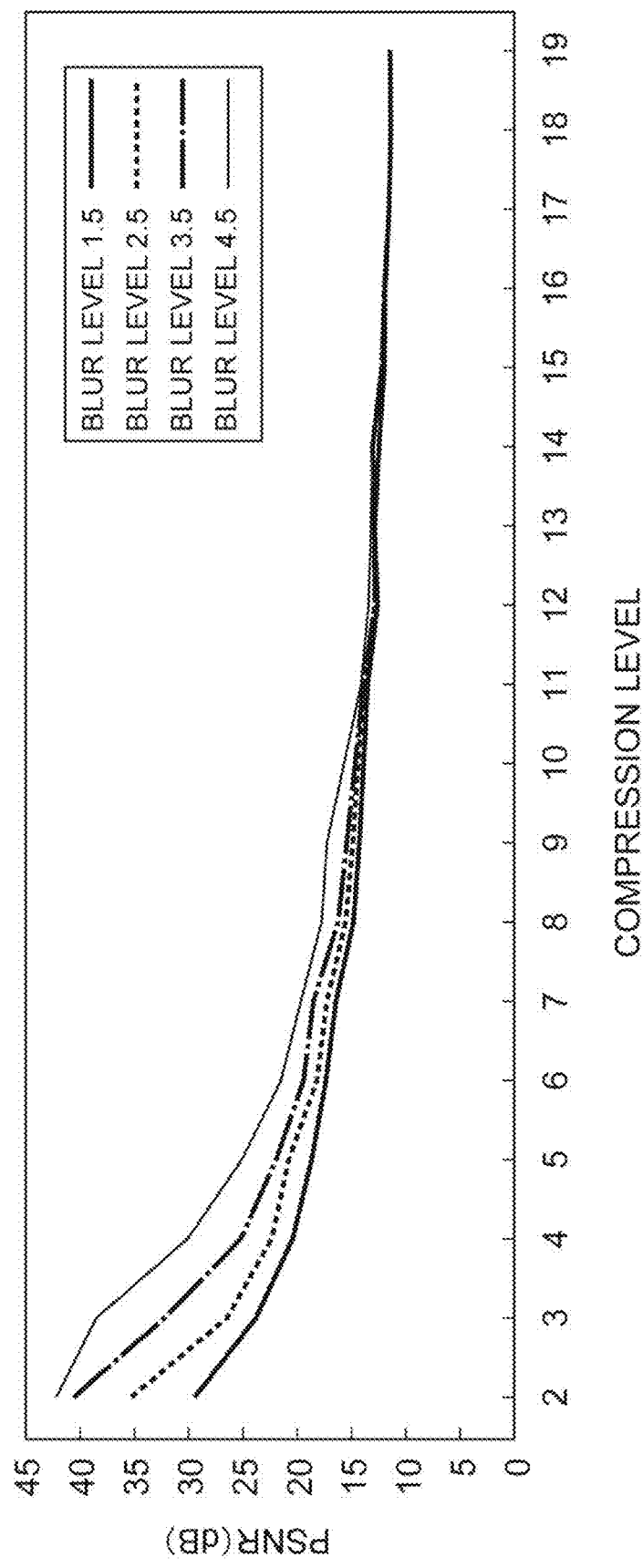
FIG. 9 is a view illustrating an example of estimation of a blur level.

FIG. 9 is a graph obtained by applying four types of blur levels (1.5, 2.5, 3.5 and 4.5) to one image and then plotting the relationship between the compression level and the PSNR for each of the blur levels. As shown therein, the curvature varies when the blur level is different even if the image is the same. Because the curvature of the graph is significantly dependent on the leading coefficient of a non-linear function, it is possible to estimate the blur level of various images based on a standardized reference by using this leading coefficient.

FIG. 10 is a table showing an example of the correspondence between the blur level and the leading coefficient of the quadratic function (the non-linear function representing the relationship between the compression level and the PSNR) for five types of images (baby, bird, butterfly, baboon and lena). Those five types of images are commonly available, and they can be obtained from the data sets Set 5 and Set 14, which are described in the reference literature below, for example. To be more specific, each of the images can be obtained from the website specified by the URL "http://cv.snu.ac.kr/research/VDSR/". Each quadratic function approximates the relationship between the compression level and the PSNR, which is obtained by calculating the PSNR while changing the compression level to 2, 3, 4, ..., 19. (Reference Literature) T. Kim, J. K. Lee, and K. M. Lee. "Accurate Image Super-Resolution Using Very Deep Convolutional Networks". CoRR, abs/1511.04587, 2015.

Figure 11:
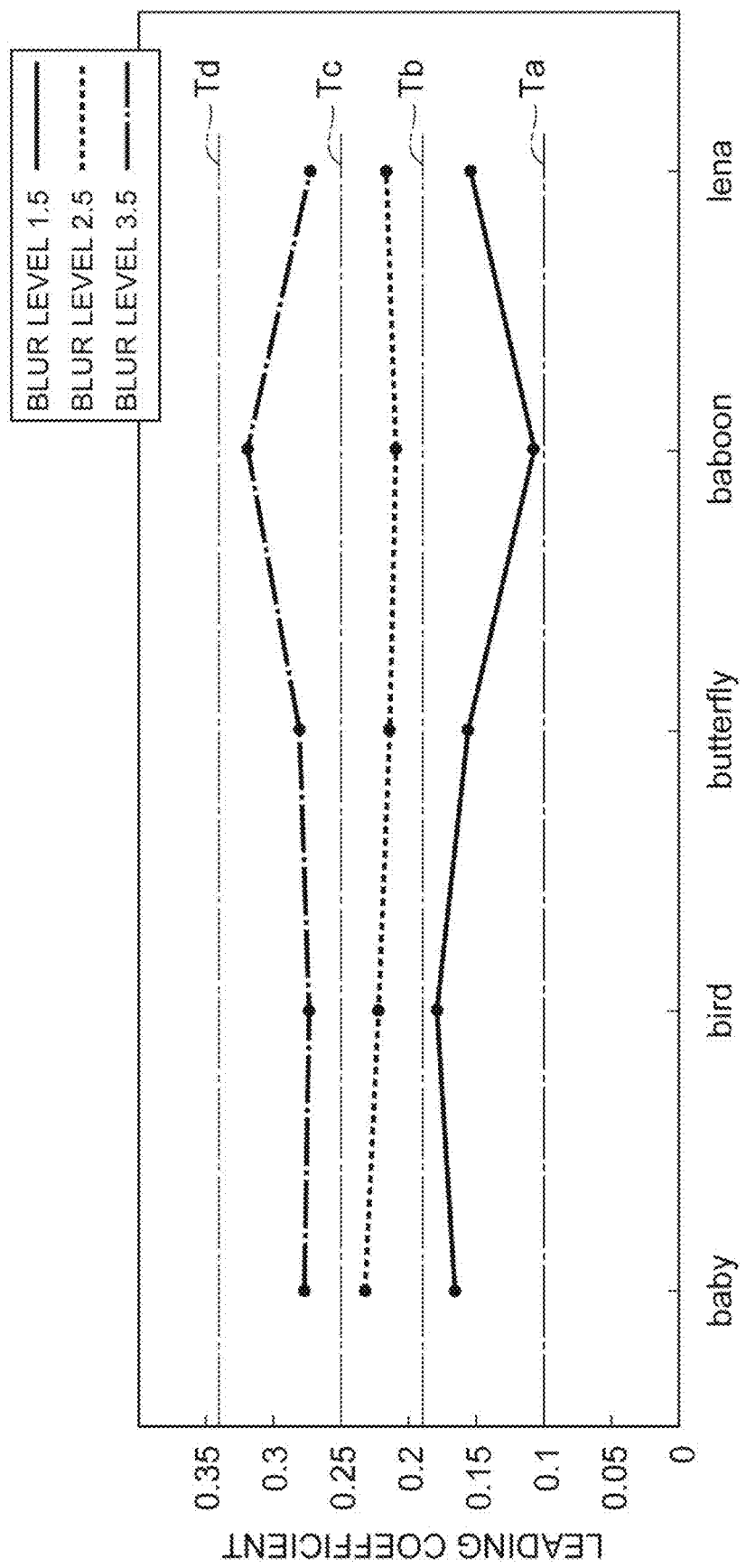
FIG. 11 is a view illustrating an example of estimation of a blur level.

FIG. 11 is a graph made from the table shown in FIG. 10, where the vertical axis indicates the leading coefficient of the quadratic function. As shown in this graph, the leading coefficient is within a certain range according to the blur level regardless of the image type. Therefore, the blur level of the image can be determined by setting the correspondence between the leading coefficient and the blur level in advance and then determining to which blur level the obtained leading coefficient corresponds. A method of representing the correspondence is not particularly limited, and it may be represented by a table (correspondence table), for example. The image processing device 10 (e.g., the estimation unit 14) previously stores this correspondence. In the example of FIG. 11, the range where the blur level is 0 (no blur) is set to be equal to or more than 0 and less than Ta, the range where the blur level is 1.5 is set to be equal to or more than Ta and less than Tb, the range where the blur level is 2.5 is set to be equal to or more than Tb and less than Tc, and the range where the blur level is 3.5 is set to be equal to or more than Tc and less than Td. For example, when Ta=0.1, Tb=0.18, Tc=0.25 and Td=0.34, the leading coefficient of the graph shown in FIG. 9 is 0.1528, and the estimation unit 14 estimates the blue level as 1.5.

After that, the super-resolution unit 15 performs super-resolution on the input image based on the estimated blur level (Step S15). The super-resolution unit 15 previously stores a plurality of learning models for super-resolution (neural networks for super-resolution) respectively corresponding to a plurality of blur levels. The super-resolution unit 15 selects the learning model corresponding to the estimated blur level from them, executes super-resolution on the input image by using the selected learning model, and outputs the execution result as a high-resolution image.

Generally, one learning model can perform super-resolution with a specified ratio only, and therefore it is applicable only to an image with a specified blur level. It is thus necessary to use a learning model that matches the blur level of an image. If a learning model that does not match the blur level is used, the image quality is rather degraded. In view of this, the super-resolution unit 15 selects the learning model that matches the blur level from a plurality of learning models prepared in advance, and performs super-resolution by using the selected learning model.

Figure 12:
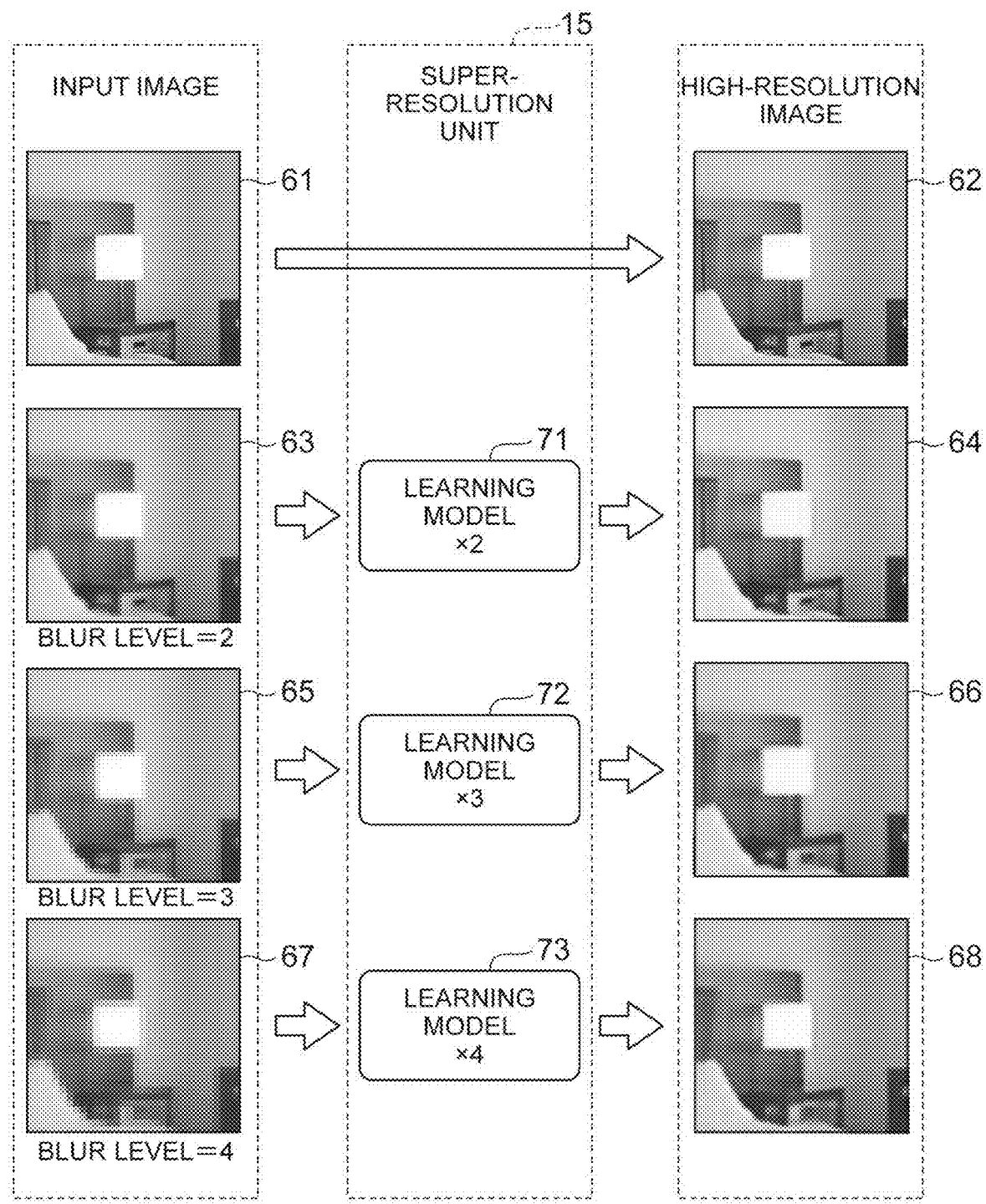
FIG. 12 is view showing an example of a technique of super-resolution.

FIG. 12 is a view illustrating an example of the configuration and processing of the super-resolution unit 15. In this example, the super-resolution unit 15 previously stores a learning model 71 for an input image with the blur level 2, a learning model 72 for an input image with the blur level 3, and a learning model 73 for an input image with the blur level 4. The super-resolution unit 15 does not perform super-resolution on an input image 61 whose blur level is estimated to be 0 and outputs this input image 61 as a high-resolution image 62 without any change. Thus, the high-resolution image 62 is the same as the input image 61. For an input image 63 whose blur level is 2, the super-resolution unit 15 performs super-resolution by using the learning model 71 and thereby generates a high-resolution image 64. For an input image 65 whose blur level is 3, the super-resolution unit 15 performs super-resolution by using the learning model 72 and thereby generates a high-resolution image 66. For an input image 67 whose blur level is 4, the super-resolution unit 15 performs super-resolution by using the learning model 73 and thereby generates a high-resolution image 68.

A method of outputting the high-resolution image is not particularly limited. For example, the super-resolution unit 15 may store the high-resolution image into a specified database, may transmit it to another computer, or may display it on a monitor. The super-resolution unit 15 may associate the high-resolution image with the input image and output a set of those two images. When the blur level is 0, the super-resolution unit 15 may output the input image without performing super-resolution. Because there is no point to perform super-resolution on an image that is estimated not to be blurred, this super-resolution is omitted to thereby reduce the processing load on hardware resources (for example, a processor and a memory) of the image processing device 10.

In the case where the image processing device 10 processes a plurality of input images, the processing of Steps S11 to S15 is repeated.

Program

Figure 13:
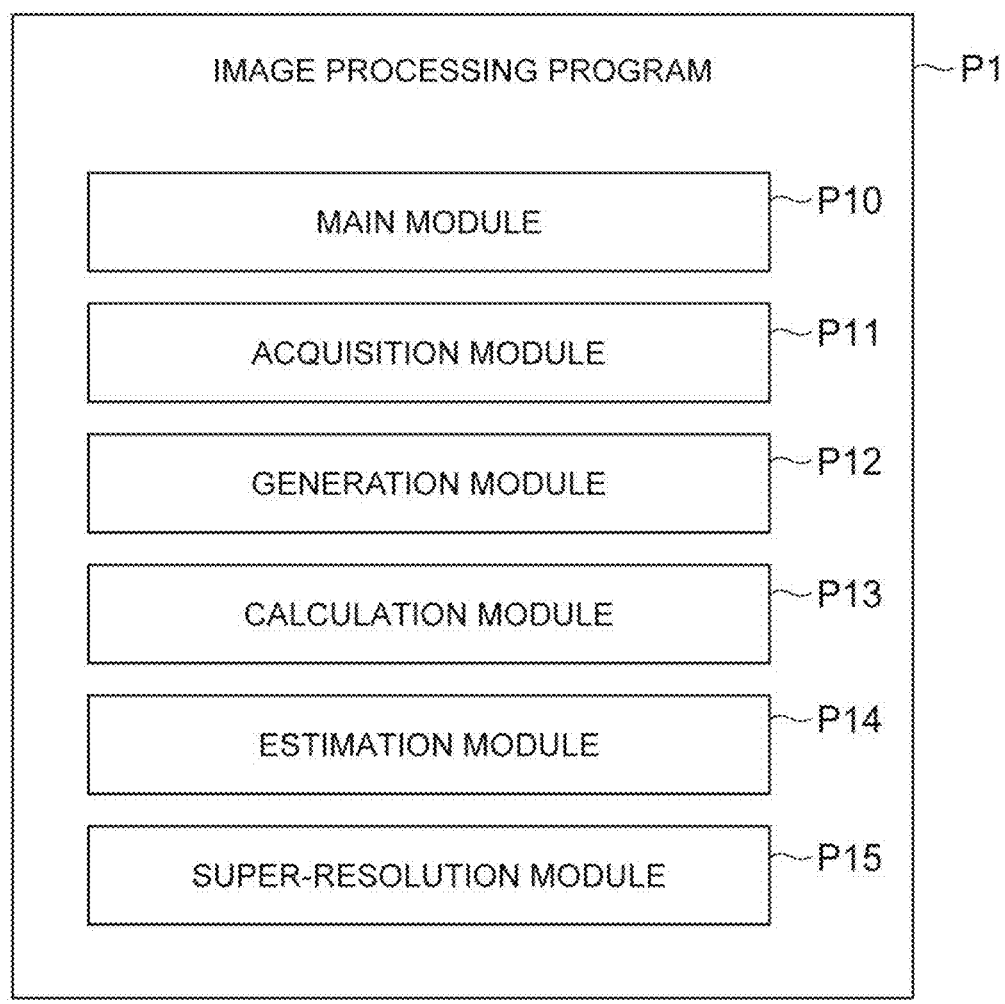
FIG. 13 is a view showing the configuration of an image processing program according to the embodiment.

An image processing program P1 that causes a computer to function as the image processing device 10 is described hereinafter with reference to FIG. 13. FIG. 13 is a view showing the configuration of the image processing program P1.

The image processing program P1 includes a main module P10, an acquisition module P11, a generation module P12, a calculation module P13, an estimation module P14, and a super-resolution module P15. The main module P10 is a part that exercises control over the estimation of the blur level and the super-resolution. The acquisition unit 11, the generation unit 12, the calculation unit 13, the estimation unit 14 and the super-resolution unit 15 are implemented by executing the acquisition module P11, the generation module P12, the calculation module P13, the estimation module P14 and the super-resolution module P15, respectively.

The image processing program P1 may be provided in the form of being recorded in a static manner on a tangible recording medium such as CD-ROM, DVD-ROM or semiconductor memory, for example. Alternatively, the image processing program P1 may be provided as a data signal superimposed onto a carrier wave through a communication network.

Advantageous Effects

As described above, an image processing device according to one aspect of the present invention includes an acquisition unit configured to acquire an input image, a generation unit configured to generate a plurality of comparison images by compressing a target region being at least part of the input image with each of a plurality of compression levels and expanding the compressed target region to its original size, a calculation unit configured to calculate, for each of the plurality of comparison images, a degradation level of the comparison image with respect to the input image, and an estimation unit configured to estimate a blur level of the input image based on a plurality of calculated degradation levels.

An image processing method according to one aspect of the present invention is an image processing method performed by an image processing device including a processor, the method including an acquisition step of acquiring an input image, a generation step of generating a plurality of comparison images by compressing a target region being at least part of the input image with each of a plurality of compression levels and expanding the compressed target region to its original size, a calculation step of calculating, for each of the plurality of comparison images, a degradation level of the comparison image with respect to the input image, and an estimation step of estimating a blur level of the input image based on a plurality of calculated degradation levels.

An image processing program according to one aspect of the present invention causes a computer to execute an acquisition step of acquiring an input image, a generation step of generating a plurality of comparison images by compressing a target region being at least part of the input image with each of a plurality of compression levels and expanding the compressed target region to its original size, a calculation step of calculating, for each of the plurality of comparison images, a degradation level of the comparison image with respect to the input image, and an estimation step of estimating a blur level of the input image based on a plurality of calculated degradation levels.

In the above-described aspects, a plurality of comparison images are obtained by compressing and expanding an input image with a plurality of ratios. Those comparison images are images where the resolution of the input image is intentionally degraded. Because a blur of the input image can be regarded as a decrease in resolution, it is possible to estimate the blur level of the input image by comparing the input image with those comparison images. Because the comparison images for estimating the blur level of the input image are generated from the input image, it is possible to estimate the absolute (or intrinsic) blur level of the input image even when there is only one input image. When a target image is the entire input image, it is possible to obtain the blur level of the entire image rather than the local blur level of the image.

In an image processing device according to another aspect, the degradation level may be peak signal-to-noise ratio. Because the PSNR objectively indicates how much the image is degraded due to compression, it is an index suitable for estimating the blur level using the comparison image obtained by compressing and expanding the input image. Thus, use of the PSNR enables accurate estimation of the blur level of the input image.

In an image processing device according to another aspect, the estimation unit may estimate the blur level by comparing the plurality of degradation levels with a threshold. By using the threshold, it is possible to estimate the blur level in simple processing and at high speed.

In an image processing device according to another aspect, the estimation unit may estimate the blur level based on a leading coefficient of a non-linear function representing a relationship between the compression level and the degradation level. The curvature of a graph indicating this non-linear function tends to vary according to the blur level regardless of the subject of the image, and the curvature is significantly dependent on the leading coefficient of the non-linear function. It is thereby possible to accurately determine the blur level based on the leading coefficient.

In an image processing device according to another aspect, a correspondence between the leading coefficient and the blur level may be set in advance, and the estimation unit may calculate the leading coefficient of the non-linear function from the plurality of compression levels and the plurality of degradation levels, and determine the blur level corresponding to the calculated leading coefficient by referring to the correspondence. By using the correspondence prepared in advance, it is possible to easily obtain the blur level from the leading coefficient.

An image processing device according to another aspect may further include a super-resolution unit configured to select a learning model corresponding to the blur level estimated by the estimation unit from a plurality of learning models for super-resolution respectively corresponding to a plurality of blur levels, and perform super-resolution on the input image by using the selected learning model. In this case, because super-resolution is performed in accordance with the blur level of the input image, it is possible to appropriately enhance the image quality of the input image.

Modified Example

An embodiment of the present invention is described in detail above. However, the present invention is not limited to the above-described embodiment. Various changes and modifications may be made to the present invention without departing from the scope of the invention.

Although the estimated blur level is used for super-resolution in the above-described embodiment, the blur level may be used for other purposes. Thus, the image processing device does not need to include the super-resolution unit. The image processing device may store the estimated blur level into a specified database, may transmit it to another computer, or may display it on a monitor. In this case, a user of the image processing device can know the blur level of the input image.

Although the PSNR is used as the degradation level in the above-described embodiment, a method of calculating the degradation level is not limited thereto. For example, the calculation unit may calculate structural similarity (SSIM) as the degradation level. The SSIM is a technique that estimates the image quality by a product of a difference in average luminance, a difference in standard deviation of pixel value, and a covariance between pixels.

Although the compression level is set as the blur level in the above-described embodiment, a method of setting the blur level is not limited thereto. For example, the estimation unit may obtain the blur level from the compression level by predetermined operation.

The procedure of the image processing method that is performed by at least one processor is not limited to the example shown in the above embodiment. For example, some of the above-described steps (processing) may be skipped, or the steps may be performed in a different order. Further, any two or more steps of the above-described steps may be combined, or some of the steps may be modified or eliminated. Alternatively, another step may be performed in addition to the above-described steps.

REFERENCE SIGNS LIST

10 . . . image processing device, 11 . . . acquisition unit, 12 . . . generation unit, 13 . . . calculation unit, 14 . . . estimation unit, 15 . . . super-resolution unit, P1 . . . image processing program, P10 . . . main module, P11 . . . acquisition module, P12 . . . generation module, P13 . . . calculation module, P14 . . . estimation module, P15 . . . super-resolution module

The invention claimed is:

1. An image processing device comprising:
   at least one memory operable to store program code; and
   at least one processor configured to read the program code and operate as instructed by the program code, the program code comprising:
   acquisition code configured to cause the at least one processor to acquire an input image;
   generation code configured to cause the at least one processor to generate a plurality of comparison images by compressing a target region being at least part of the input image with each of a plurality of compression levels and expanding the compressed target region to its original size;
   calculation code configured to cause the at least one processor to calculate, for each of the plurality of comparison images, a degradation level of the comparison image with respect to the input image;
   estimation code configured to cause the at least one processor to estimate a blur level of the input image based on a plurality of calculated degradation levels, and
   super-resolution code configured to cause the at least one processor to select a machine learning model corresponding to the blur level estimated by the estimation code from a plurality of machine learning models for super-resolution respectively corresponding to a plurality of blur levels, and input the input image into the selected machine learning model to generate a high-resolution image.

2. The image processing device according to claim 1, wherein the degradation level is peak signal-to-noise ratio.

3. The image processing device according to claim 1, wherein the estimation code is further configured to cause the at least one processor to estimate the blur level by comparing the plurality of degradation levels with a threshold.

4. The image processing device according to claim 1, wherein the estimation code is further configured to cause the at least one processor to estimate the blur level based on a leading coefficient of a non-linear function representing a relationship between the compression level and the degradation level.

5. The image processing device according to claim 4, wherein
   a correspondence between the leading coefficient and the blur level is set in advance, and
   the calculation code is further configured to cause the at least one processor to calculate the leading coefficient of the non-linear function from the plurality of compression levels and the plurality of degradation levels, and determine the blur level corresponding to the calculated leading coefficient by referring to the correspondence.

6. An image processing method performed by an image processing device including a processor, comprising:
   acquiring an input image;
   generating a plurality of comparison images by compressing a target region being at least part of the input image with each of a plurality of compression levels and expanding the compressed target region to its original size;
   calculating, for each of the plurality of comparison images, a degradation level of the comparison image with respect to the input image;
   estimating a blur level of the input image based on a plurality of calculated degradation levels;
   selecting a machine learning model corresponding to the blur level from a plurality of machine learning models for super-resolution respectively corresponding to a plurality of blur levels; and
   inputting the input image into the selected machine learning model to generate a high-resolution image.

7. A non-transitory recording medium storing an image processing program causing a computer to:
   acquire an input image;
   generate a plurality of comparison images by compressing a target region being at least part of the input image with each of a plurality of compression levels and expanding the compressed target region to its original size;
   calculate, for each of the plurality of comparison images, a degradation level of the comparison image with respect to the input image;
   estimate a blur level of the input image based on a plurality of calculated degradation levels,
   select a machine learning model corresponding to the blur level from a plurality of machine learning models for super-resolution respectively corresponding to a plurality of blur levels; and
   input the input image into the selected machine learning model to generate a high-resolution image.

* * * * *